(12) United States Patent
Ly et al.

(10) Patent No.: US 12,726,923 B2
(45) Date of Patent: Sep. 1, 2026

(54) PASSIVE MULTIPLE INPUT MULTIPLE OUTPUT CONTROL INTERFACE

(71) Applicant: QUALCOMM Incorporated, San Diego, CA (US)

(72) Inventors: Hung Dinh Ly, San Diego, CA (US); Yu Zhang, San Diego, CA (US); Saeid Sahraei, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/287,117

(22) PCT Filed: Jun. 18, 2021

(86) PCT No.: PCT/CN2021/100820
§ 371 (c)(1),
(2) Date: Oct. 16, 2023

(87) PCT Pub. No.: WO2022/261921
PCT Pub. Date: Dec. 22, 2022

(65) Prior Publication Data

US 2024/0205852 A1 Jun. 20, 2024

(51) Int. Cl.
*H04W 56/00* (2009.01)
*H04B 7/04* (2017.01)
(Continued)

(52) U.S. Cl.
CPC .... *H04W 56/0015* (2013.01); *H04B 7/04013* (2023.05); *H04L 5/0051* (2013.01); *H04W 72/232* (2023.01)

(58) Field of Classification Search
CPC ........... H04W 56/0015; H04W 72/232; H04B 7/04013; H04L 5/0051
See application file for complete search history.

(56) References Cited

U.S. PATENT DOCUMENTS

2023/0107283 A1* 4/2023 Park ..................... H04W 16/28 370/329
2023/0258759 A1* 8/2023 Wang ................... G01S 5/0036 455/456.1

(Continued)

FOREIGN PATENT DOCUMENTS

CN 101141171 A 3/2008
CN 111245494 A 6/2020

(Continued)

OTHER PUBLICATIONS

International Search Report and Written Opinion—PCT/CN2021/100820—ISA/EPO—Mar. 3, 2022.

(Continued)

*Primary Examiner* — Jael M Ulysse
(74) *Attorney, Agent, or Firm* — Polsinelli

(57) ABSTRACT

A method and apparatus for a reflective intelligent surface (RIS) control interface. The apparatus transmits, to a RIS, a synchronization signal to establish a level of synchronization between the base station and the RIS. The level of synchronization between the base station and the RIS configures the RIS to receive a control signal from the base station. The apparatus transmits, to the RIS, the control signal comprising a RIS configuration. The apparatus may transmit, to the RIS, a signal for reflection by the RIS to at least a first wireless device.

30 Claims, 14 Drawing Sheets

(51) Int. Cl.
*H04L 5/00* (2006.01)
*H04W 72/232* (2023.01)

(56) References Cited

U.S. PATENT DOCUMENTS

| | | | | |
|---|---|---|---|---|
| 2023/0308141 | A1* | 9/2023 | Wang | H04W 72/53 |
| 2023/0327714 | A1* | 10/2023 | Baligh | H04B 7/088<br>375/262 |
| 2024/0089744 | A1* | 3/2024 | Fujishiro | H04W 24/02 |
| 2024/0090050 | A1* | 3/2024 | Fujishiro | H04B 7/04013 |
| 2024/0171257 | A1* | 5/2024 | Yoshioka | H04B 7/145 |

FOREIGN PATENT DOCUMENTS

| | | | |
|---|---|---|---|
| CN | 112260739 | A | 1/2021 |
| CN | 112332548 | A | 2/2021 |
| CN | 112769726 | A | 5/2021 |
| WO | 2018128346 | A1 | 7/2018 |

OTHER PUBLICATIONS

Supplementary European Search Report—EP21945506—Search Authority—The Hague—Jan. 22, 2025.

* cited by examiner

520
...$C_2$, $C_1$ ...
OTA control
522
RIS Controller
510
508
512
502
514
$W_1$
516
$W_2$
UE1
504
UE2
506

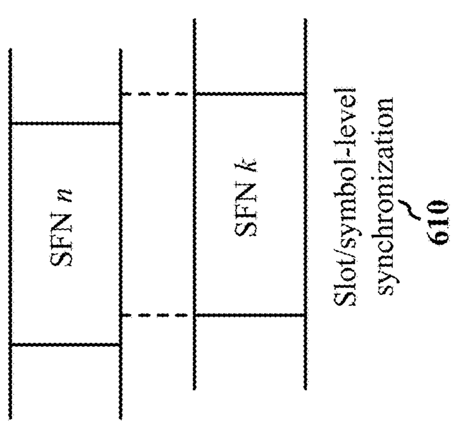
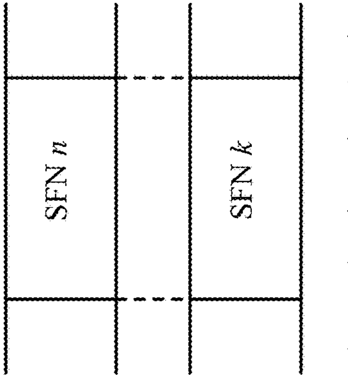
FIG. 6
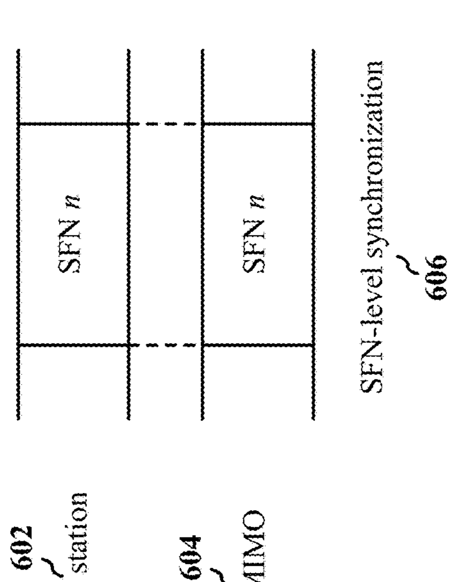

1200

PASSIVE MULTIPLE INPUT MULTIPLE OUTPUT CONTROL INTERFACE

CROSS REFERENCE TO RELATED APPLICATION(S)

This application is a National Stage Application filed under 35 U.S.C. § 371 of PCT International Application No. PCT/CN2021/100820, entitled "PASSIVE MULTIPLE INPUT MULTIPLE OUTPUT CONTROL INTERFACE" and filed Jun. 18, 2021, which is expressly incorporated by reference herein in its entirety.

TECHNICAL FIELD

The present disclosure relates generally to communication systems, and more particularly, to a configuration for a passive-multiple input multiple output (P-MIMO) control interface.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus transmits, to a reflective intelligent surface (RIS), a synchronization signal to establish a level of synchronization between the base station and the RIS. The level of synchronization between the base station and the RIS configures the RIS to receive a control signal from the base station. The apparatus transmits, to the RIS, the control signal comprising a RIS configuration.

In an aspect of the disclosure, a method, a computer-readable medium, and an apparatus are provided. The apparatus may be a device at a UE. The device may be a processor and/or a modem at a UE or the UE itself. The apparatus receives, from a base station, a synchronization signal to establish a level of synchronization between the base station and the RIS. The level of synchronization between the base station and the RIS configures the RIS to receive a control signal from the base station. The apparatus receives, from the base station, the control signal comprising a RIS configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating examples of synchronization levels.

DETAILED DESCRIPTION

Figure 1:
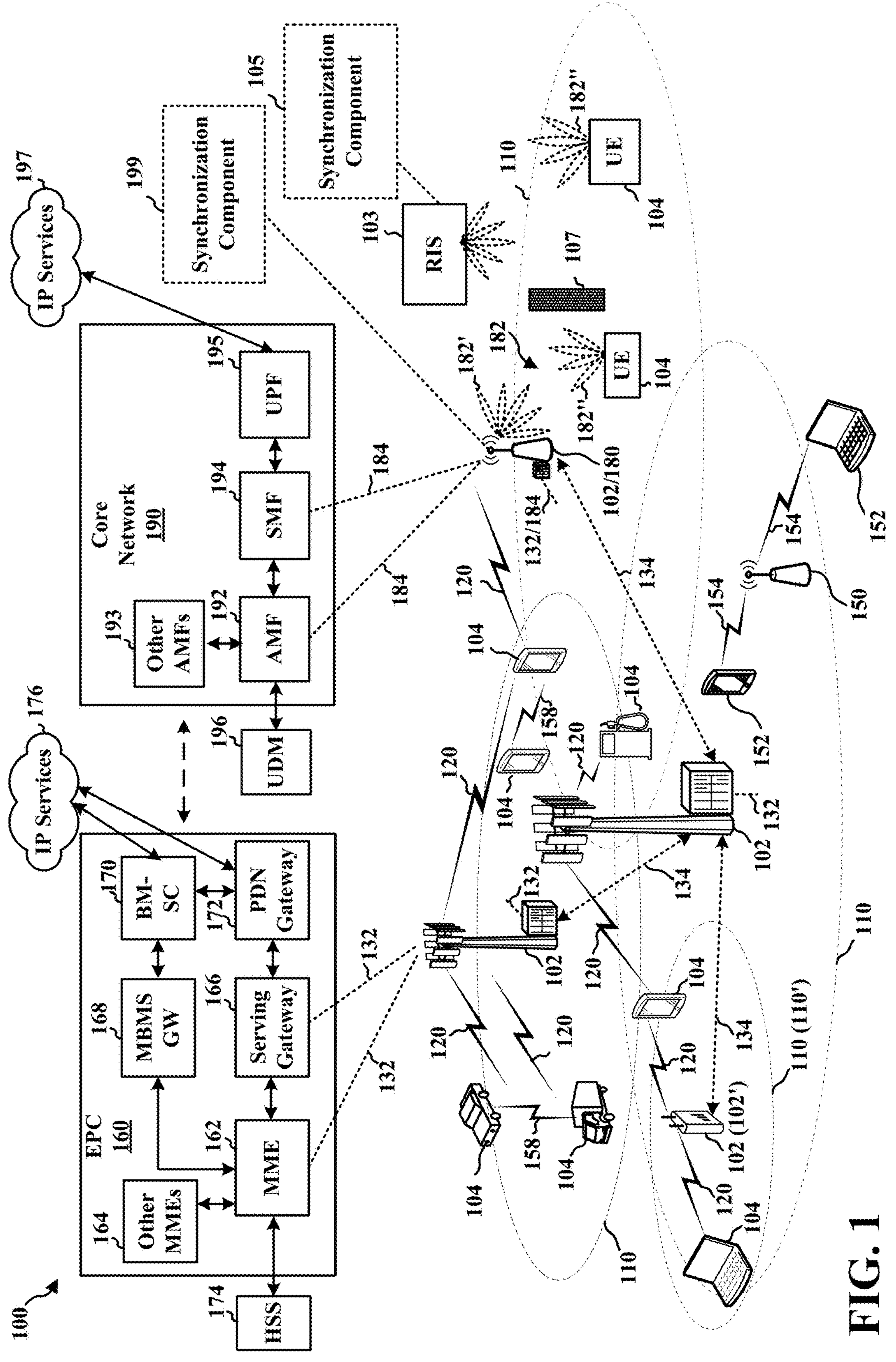
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUS), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 180 may be configured to provide an over the air control interface for a RIS. For example, the base station 180 may comprise a synchronization component 199 configured to transmit, to a RIS 103, a synchronization signal to establish a level of synchronization between the base station and the RIS. The level of synchronization between the base station and the RIS may configure the RIS to receive a control signal from the base station.

Referring again to FIG. 1, in certain aspects, the RIS 103 may be configured to receive an over the air control interface from a base station 180. For example, the RIS 103 may comprise a synchronization component 105 configured to receive, from a base station 180, a synchronization signal to establish a level of synchronization between the base station and the RIS. The level of synchronization between the base station and the RIS may configure the RIS to receive a control signal from the base station.

Although the following description may be focused on 5G NR, the concepts described herein may be applicable to other similar areas, such as LTE, LTE-A, CDMA, GSM, and other wireless technologies.

Figures 2A, 2B, 2C, 2D:
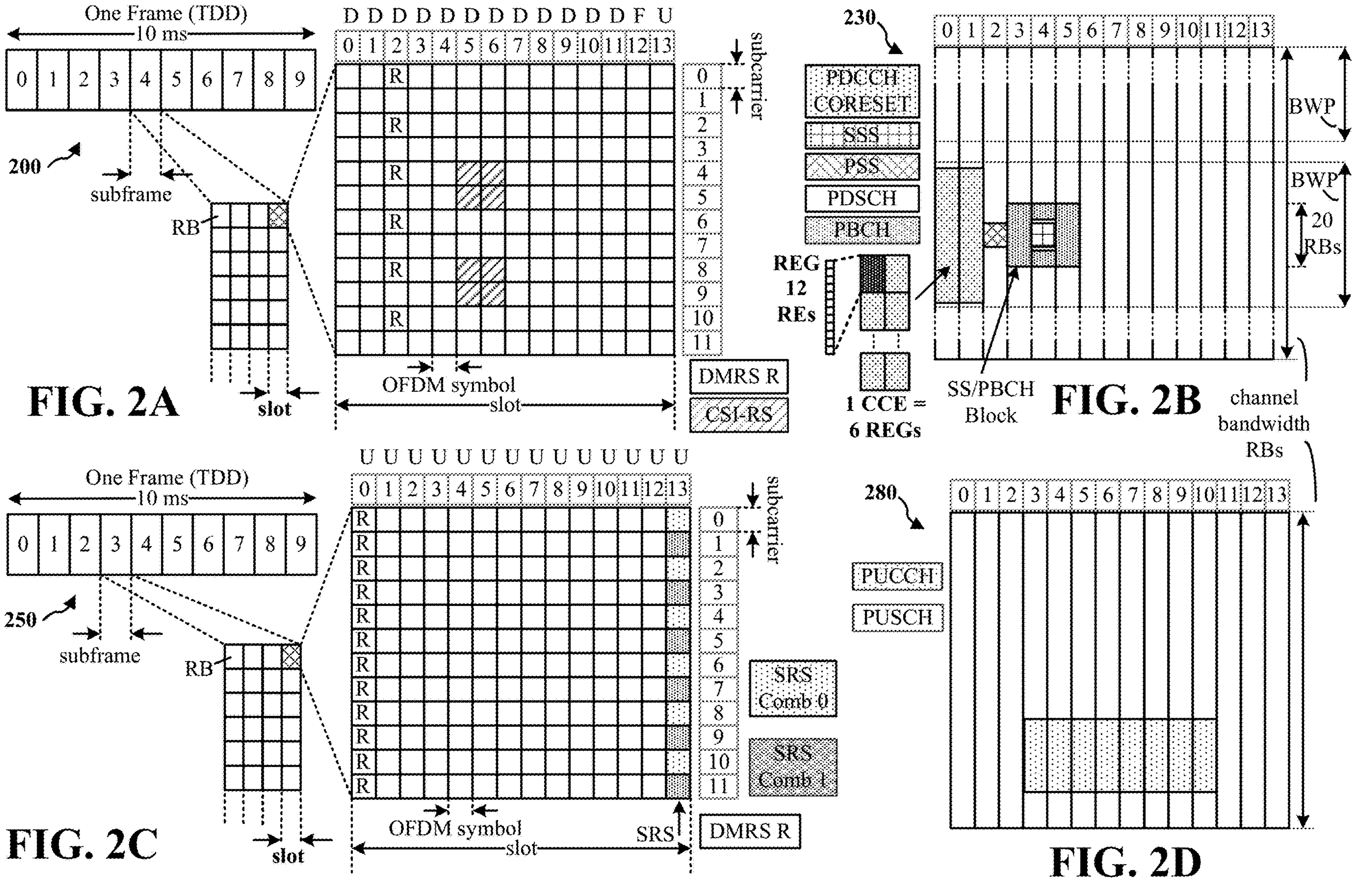
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
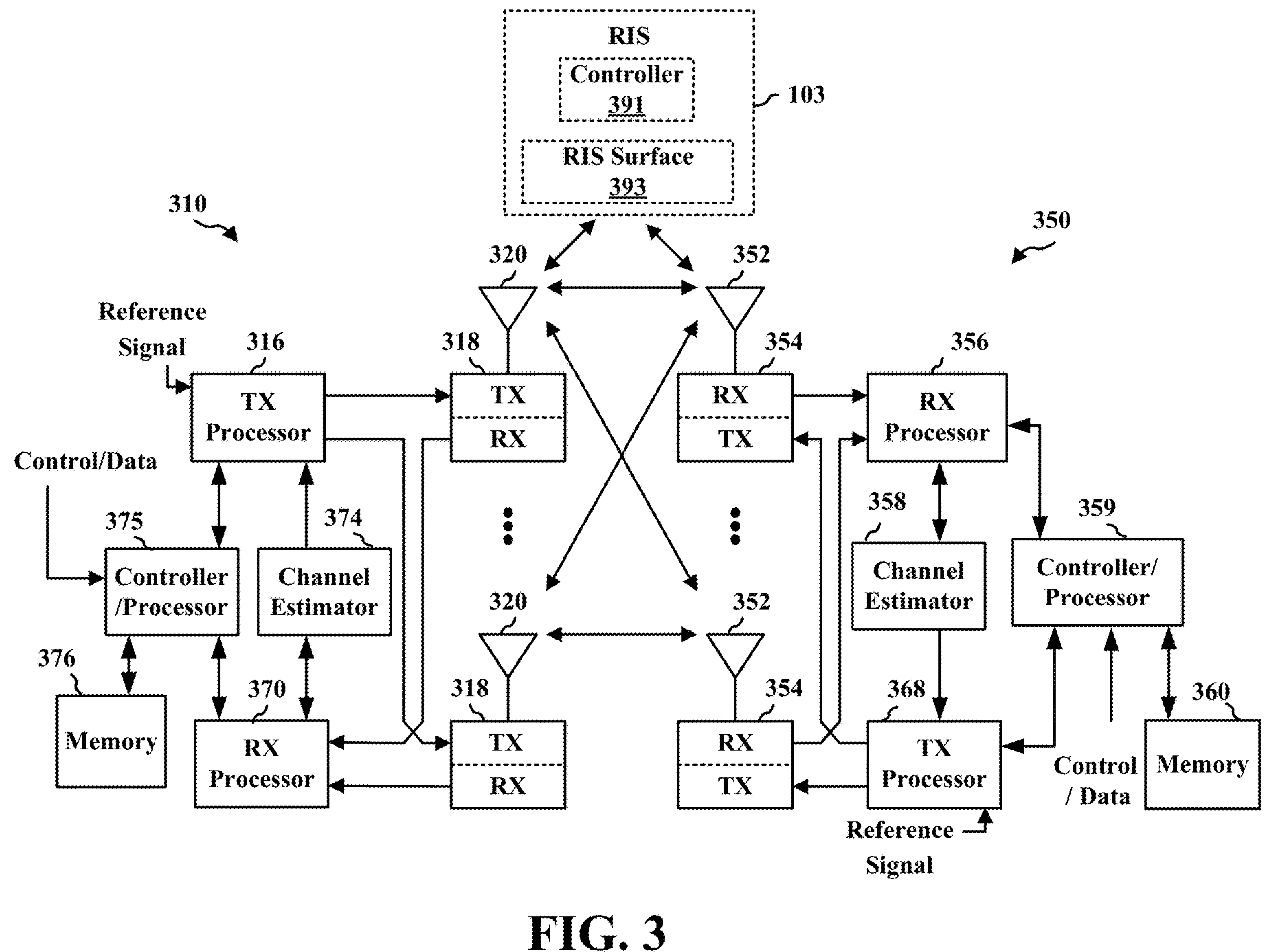
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some aspects, communication may be provided between the base station and the UE by a RIS 103, such as described in connection with any of FIG. 1 or FIGS. 4-14. The communication may be intelligently reflected, e.g., by a P-MIMO surface 393 of the RIS 103.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, onto mapping physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 or 105 of FIG. 1.

At least one of the TX processor 316, the RX processor 370, and the controller/processor 375 may be configured to perform aspects in connection with 199 or 105 of FIG. 1.

Massive MIMO may help to increase throughput in a wireless communication system. Beamforming gain may be achieved through the use of active antenna units. Individual RF chains may be used per antenna port. The use of active antenna units (AAU) may increase power consumption. A RIS may be employed to extend coverage, e.g., beamformed coverage, with reduced power consumption. The RIS may include a larger number of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and a reflection configuration of the RIS may be controlled by the base station. The RIS may reflect an impinging wave based on the reflection configuration indicated by the base station to a UE.

An RIS may be deployed in wireless communication systems, including cellular systems, such as LTE, NR, etc. An RIS may alter the channel realization in a controlled manner, which may improve channel diversity. The increased diversity may provide robustness to channel blocking/fading, which may be of particular importance for mmWave communication. Compared to a wireless relay or repeater systems, an RIS may be more cost and energy efficient.

Figure 4A:
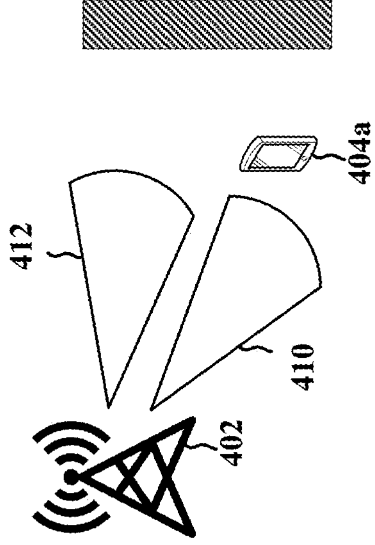
FIG. 4A is a diagram illustrating a blockage to wireless communication between a base station and a UE.
Figure 4B:
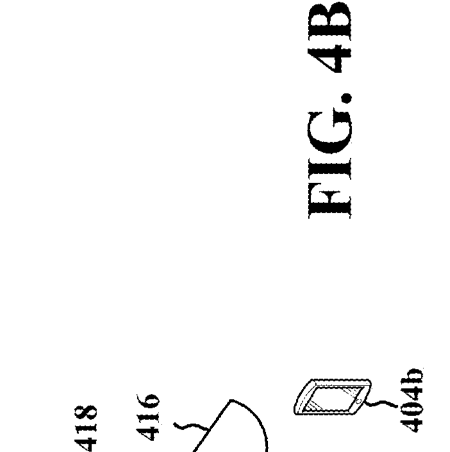
FIG. 4B is a diagram illustrating an RIS that intelligently reflects communication between a base station and a UE.
Figure 4B:
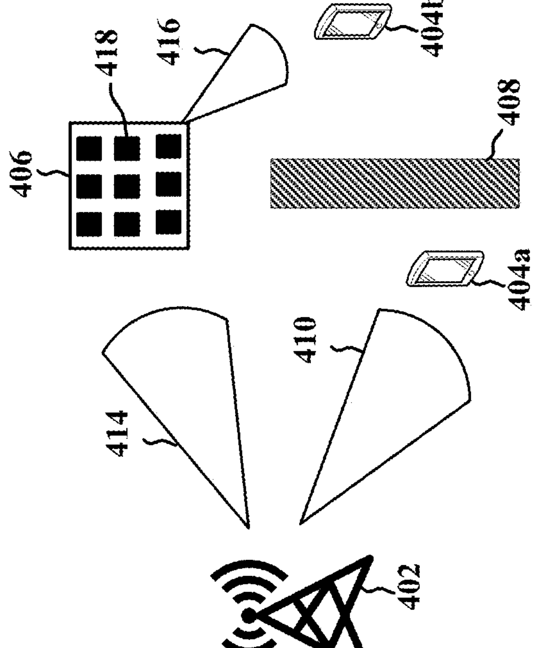

A base station may control the RIS to extend beam coverage and/or to address blockages between the base station and the UE. FIG. 4A illustrates an example in which a base station 402 transmits beamformed communication to UEs using directional beams 410, 412. A first UE 404*a* may be able to receive the direct transmission using the beam 410. However, FIG. 4A illustrates a blockage 408 that blocks the beam 412 from reception at the second UE 404*b*. As illustrated in FIG. 4B, the base station 402 may transmit communication for the second UE 404*b* µsing a directional beam 414 (which may be referred to as the impinging beam) to the RIS 406 for reflection over a directional beam 416 to the UE 404*b*. The base station 402 may indicate the beam direction 416 to the RIS, and the RIS may reflect the impinging wave on beam 414 in the direction of the beam 416. The RIS may include multiple RIS elements 418 that are configured to adjust at least the reflected direction or the beam width to reflect the impinging wave towards a desired direction.

The RIS may be configured to change the reflection configuration. The base station may provide a configuration to the RIS which may include instructions to change the reflection configuration. Signaling between the RIS and the base station may occur in order to provide the configuration to the RIS. For example, with reference to the diagram 500 of FIG. 5A, the base station 502 may have a wired connection with a RIS controller 510 of the RIS 508 to provide a wired control signal 518 which may comprise a RIS configuration. The base station 502 may provide the wired control signal 518 to change the reflection configuration at the RIS 508, such that the signal 512 from the base station 502 may be reflected at signal 514 towards UE1 504. In some aspects, the wired control signal 518 may instruct the RIS 508 to change the reflection configuration such that the signal 512 from the base station 502 may be reflected at signal 516 towards UE2 506. However, the base station having a wired connection with the RIS may limit scalability of adding a new RIS into the network which may also be costly to install a dedicated wired connection.

Figures 5A, 5B:
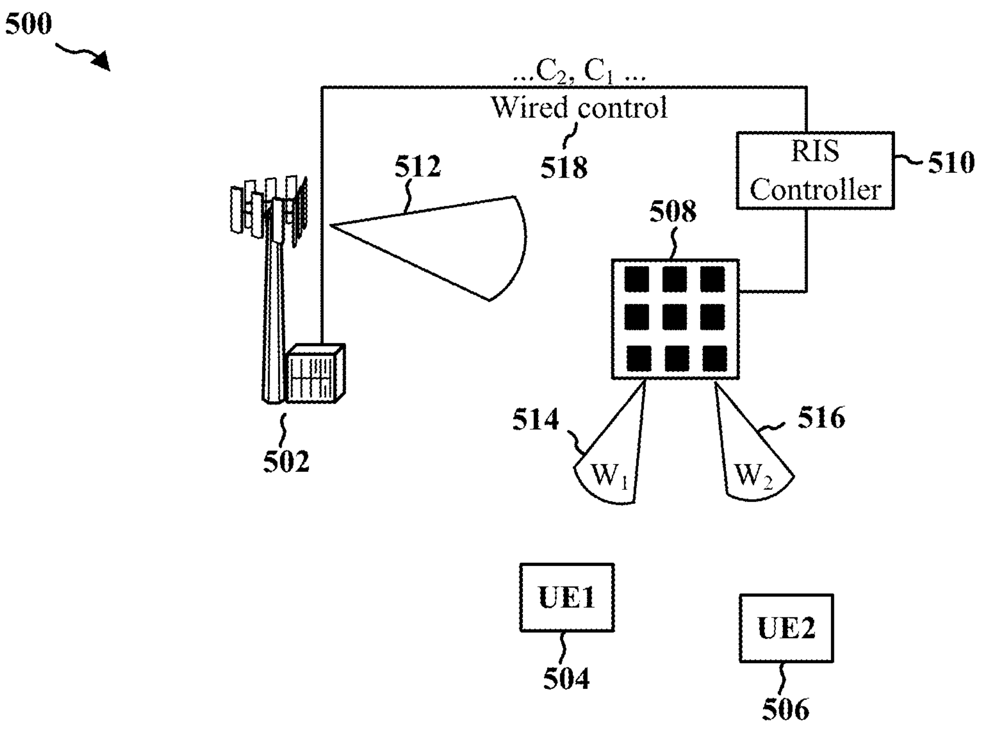
FIG. 5A is a diagram of a base station having a wired connection with a RIS.
FIG. 5B is a diagram of a base station having a wireless connection with a RIS.

With reference to diagram 520 of FIG. 5B, the base station 502 may have a wireless connection with the RIS controller 510 of the RIS 508 to provide a wireless over the air (OTA) control signal 522 which may comprise a RIS configuration. To support the wireless connection with the base station 502, the RIS 508 may comprise at least some RX capability. In some instances, the RIS 508 may have TX capability, while in some instances, the RIS 508 may not have TX capability. The RIS 508 having at least some RX capability may also comprise some baseband modem processing, but in instances that the RIS 508 does not have TX capability, may allow for the RIS 508 to not comprise a power amplifier which may substantially reduce power consumption at the RIS 508. In such instances, the RIS 508 may be considered a passive device or a nearly passive device. The base station 502 having a wireless connection with a RIS may allow for a configuration that is easily scalable, such that adding a new RIS to the network may be easily accomplished.

In some aspects, the wireless connection or OTA interface between the base station and the RIS may utilize a light-weight air interface. However, to enable the light-weight air interface, the RIS or P-MIMO, may comprise TX capabilities in addition to RX capabilities. The RIS or P-MIMO may receive a signal from the base station that may configure the RIS or P-MIMO, and the RIS or P-MIMO may transmit a control signal to the base station in response. However, the RIS or P-MIMO comprising TX capabilities and RX capabilities may prevent the RIS or P-MIMO from being a passive device or nearly passive device due to the presence of a power amplifier to support at least the TX capabilities. In some aspects, the wireless connection or OTA interface between the base station the that RIS or P-MIMO may utilize a unified air interface.

The unified air interface may allow for OTA control of the P-MIMO without having to send a signal back to the base station from the P-MIMO. The P-MIMO not having to transmit a signal back to the base station may allow for the P-MIMO to not comprise TX capabilities, meaning that the P-MIMO does not comprise a power amplifier. The P-MIMO may comprise RX capabilities, such that the P-MIMO may be a low power device or a nearly passive device.

Synchronization between the base station and the P-MIMO may be established in order for the wireless connection to be supported between the base station and the P-MIMO. With the P-MIMO not having TX capabilities, the communication between the base station and the P-MIMO is going to be one-way communication, such that the base station and the P-MIMO should be synchronized. In order to enable the unified air interface, a level of synchronization between the base station and the P-MIMO should be present, due to the P-MIMO being a passive device or nearly passive device. The P-MIMO should be synchronized with the base station so that the P-MIMO may be prepared or expecting to receive a control signal from the base station. For example, the P-MIMO may be configured to operate in a discontinuous reception (DRX) configuration, and should be synchronized with the base station such that the P-MIMO wakes up from a DRX state to receive the control signal from the base station. In another example, the base station may configure the P-MIMO using RRC signaling when transmitting a PDSCH to the P-MIMO, the P-MIMO should be synchronized with the base station in order to be listening at the correct time to receive the PDSCH. There are various levels of synchronization that may be utilized to synchronize the base station and the P-MIMO. For example, with reference to diagram 600 of FIG. 6, the synchronization level between a base station 602 and a P-MIMO 604 may comprise a system frame number (SFN) level synchronization 606, a frame level synchronization 608, or a slot/symbol level synchronization 610. Synchronization may be performed at initial access where the base station transmits a MIB to the P-MIMO. The P-MIMO may maintain synchronization with the base station by monitoring SFN information within the MIB. The P-MIMO may determine the SFN by decoding a MIB transmission. Frame level synchronization and/or slot/symbol level synchronization may be obtained by the P-MIMO acquiring the frame/slot timing and the SFN.

To transmit the control signal to the P-MIMO, the base station, in some aspects, may utilize a sequence based control that may be similar to PUCCH format 0, which is used in the uplink from a wireless device to a base station. The sequence based control channel may allow for the P-MIMO to be a nearly passive device or a passive device. The P-MIMO may comprise a simple receiver and does not have to perform channel estimation. The P-MIMO may try various sequences and computes the correlation between the sequences and the received signal in order to decode the control channel. The sequence based control channel may be robust and less sensitive to frequency error. The sequence based control channel may also support a large number of P-MIMOs, such that different P-MIMOs may be associated with different sequences.

In some aspects, to transmit the control signal to the P-MIMO, the base station may utilize a PDCCH based control channel, where QAM modulation is used and DMRS is inserted between symbols. The PDCCH based control channel may leverage existing PDCCH, but the P-MIMO may comprise a more complex receiver in comparison to the receiver used in the sequence based control channel. In some aspects, a scrambling sequence that is used for the PDCCH based control channel may be based on a physical cell identifier (PCI) of the base station and an identifier of the P-MIMO, such that the control information may only be decoded by the particular P-MIMO and if transmitted from the corresponding base station associated with the PCI.

Figure 7B:
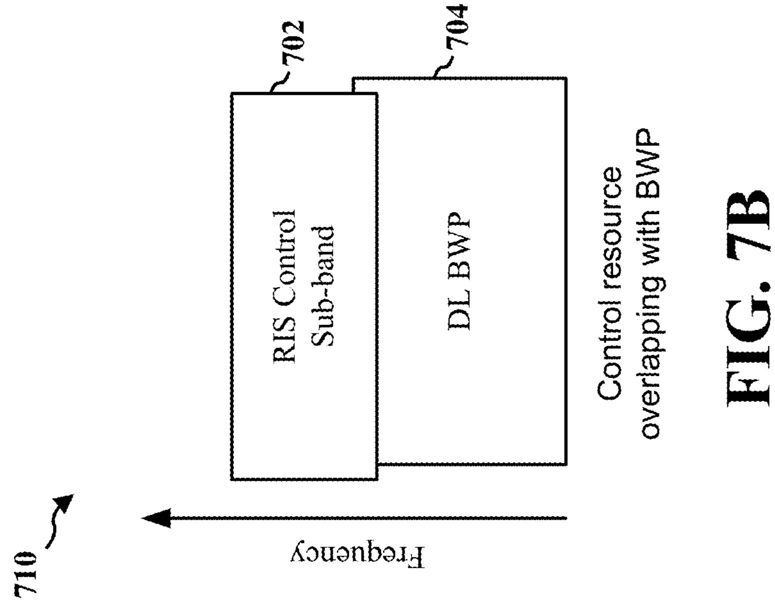
FIG. 7B is a diagram illustrating frequency resources of a P-MIMO control signal and a UE DL bandwidth part.
Figure 7A:
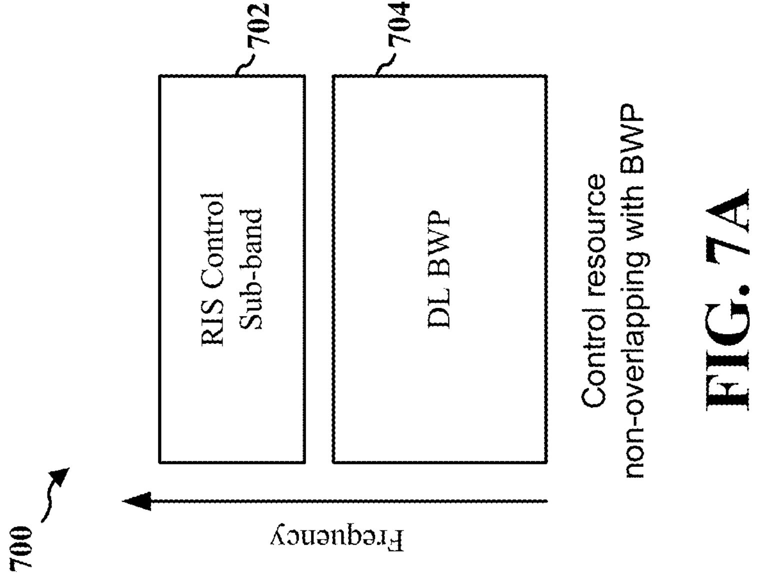
FIG. 7A is a diagram illustrating frequency resources of a P-MIMO control signal and a UE DL bandwidth part.

In some aspects, the bandwidth part for the control information does not overlap with the bandwidth part that is used for transmission to the UE, as shown for example in diagram 700 of FIG. 7A. For example, the control information 702 for the P-MIMO does not change based on the DL bandwidth part 704 for a UE. In such instances, bandwidth part switching may be utilized for the UE, while the bandwidth part is fixed for the P-MIMO control information. In some aspects, a time-frequency tracking at the P-MIMO may be based on the P-MIMO control channel rather than being based on a PDCCH that is transmitted to the UE.

In some aspects, the bandwidth part for the control information may overlap with the bandwidth part that is used for transmission to the UE, as shown for example in diagram 710 of FIG. 7B. In such instances, the overlap may be indicated to the UE, such that the UE is aware of the overlap between the DL bandwidth part 704 for transmission to the UE and the control information 702 for the P-MIMO.

Figure 8:
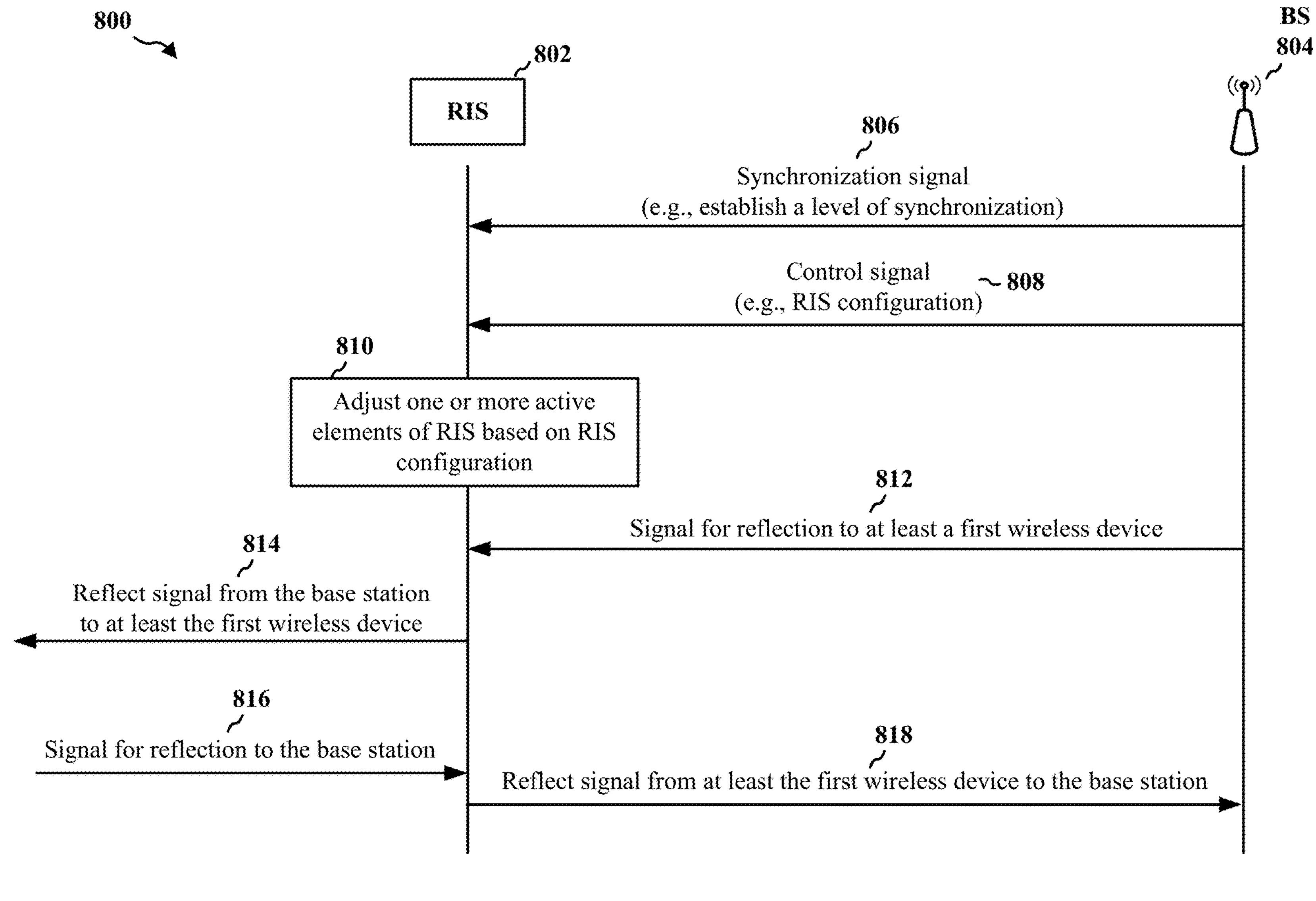
FIG. 8 is a call flow diagram of signaling between a base station and a P-MIMO.

FIG. 8 is a call flow diagram 800 of signaling between a RIS 802 and a base station 804. The base station 804 may be configured to provide at least one cell. The RIS 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a RIS 802 may correspond to at least RIS 103. In another example, in the context of FIG. 3, the base station 804 may correspond to base station 310.

As illustrated at 806, the base station 804 may transmit a synchronization signal to the RIS 802. The RIS 802 may receive the synchronization signal from the base station 804. The synchronization signal may establish a level of synchronization between the base station and the RIS. The level of synchronization between the base station and the P-MIMO may configure the RIS to receive a control signal from the base station. In some aspects, the level of synchronization may be based on at least one of SFN level synchronization, frame level synchronization, or slot/symbol level synchronization.

As illustrated at 808, the base station 804 may transmit the control signal to the RIS 802. The RIS 802 may receive the control signal from the base station 804. The control signal may comprise a RIS configuration. In some aspects, the RIS configuration may comprise a reflection configuration that may configure the RIS to reflect a signal from the base station to at least a first wireless device. In some aspects, the reflection configuration may configure the RIS to reflect a signal from at least the first wireless device to the base station. In some aspects, the reflection configuration may configure the RIS to operate as a scattering device, such that the impinging wave is scattered by the RIS. In some aspects, the RIS may be deployed in near field instances, such that the reflection configuration may alter a focal point of the RIS. In some aspects, the reflection configuration may include a time-varying reflection matrix for watermarking purposes. In some aspects, the reflection configuration may include a power-on and/or a power-off capability to configure the RIS to either power-on or to power-off. The reflection configuration may indicate timing information in which at least the first wireless device is scheduled to receive a transmission from the base station. The reflection configuration may indicate timing information in which the base station is scheduled to receive a transmission from at least the first wireless device. In some aspects, the control signal may comprise a sequence based control channel. In some aspects, the control signal may comprise a PDCCH based control channel. The control signal may include DMRS between symbols and may be modulated using QAM. In some aspects, a scrambling sequence of the PDCCH based control channel may be based on a physical cell identifier of the base station and an identifier of the RIS. In some aspects, the control signal may be transmitted in dedicated resources independent of a downlink bandwidth part for transmission to at least a first wireless device. In some aspects, the dedicated resources of the control signal may overlap the downlink bandwidth part. The downlink bandwidth part may include an indication for at least the first wireless device indicating that the dedicated resources of the control signal overlap the downlink bandwidth part transmitted to at least the first wireless device. In some aspects, the dedicated resources of the control signal do not overlap the downlink bandwidth part. In some aspects, a time-frequency tracking at the RIS may be based on the control signal transmitted to the RIS.

As illustrated at 810, the RIS 802 may adjust one or more active elements of the RIS based on the RIS configuration. The RIS may adjust the one or more active elements of the RIS based on the RIS configuration to reflect a signal, from the base station, to at least a first wireless device. The RIS may adjust the one or more active elements of the RIS based on the RIS configuration to reflect a signal, from at least the first wireless device, to the base station.

As illustrated at 812, the base station 804 may transmit a signal for reflection. The base station may transmit, to the RIS 802, the signal for reflection. The RIS 802 may receive the signal for reflection from the base station 804. The base station may transmit, to the RIS, the signal for reflection by the RIS to at least a first wireless device.

As illustrated at 814, the RIS 802 may reflect the signal from the base station to the at least the first wireless device. The RIS 802 may reflect the signal from the base station to the at least the first wireless device based on the RIS configuration received from the base station 804. The RIS configuration may indicate the location, direction, and/or timing information of the at least the first wireless device which is scheduled to receive a transmission from the base station.

As illustrated at 816, the RIS 802 may receive a signal for reflection. The UE (not shown) may transmit, to the RIS 802, the signal for reflection. The RIS 802 may receive the signal for reflection from the UE. The RIS 802 may receive the signal for reflection from the UE to the base station.

As illustrated at 818, the RIS 802 may reflect the signal from the UE to the base station 804. The RIS 802 may reflect the signal from the UE to the base station 804 based on the RIS configuration received from the base station 804. The RIS configuration may indicate the location, direction, and/or timing information of the base station which is scheduled to receive a transmission from the UE.

Figure 9:
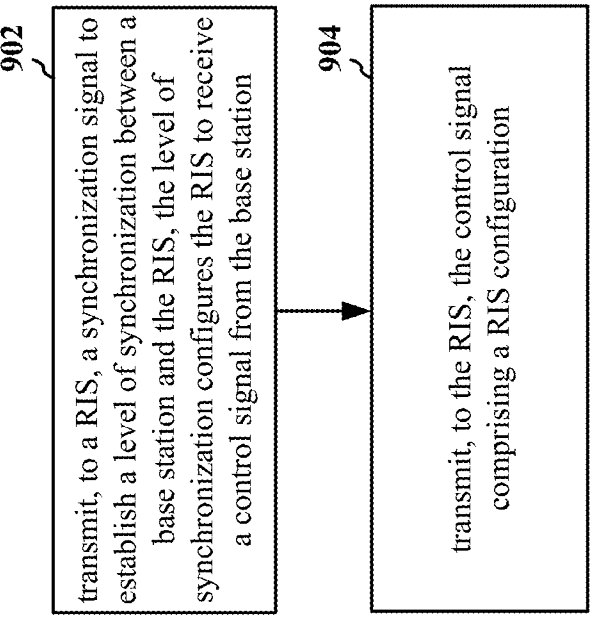
FIG. 9 is a flowchart of a method of wireless communication.
Figure 9:

FIG. 9 is a flowchart 900 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to provide an over the air control interface for a RIS.

At 902, the base station may transmit a synchronization signal. For example, 902 may be performed by synchronization component 1140 of apparatus 1102. The base station may transmit the synchronization signal to a RIS. The synchronization signal may establish a level of synchronization between the base station and the RIS. The level of synchronization between the base station and the P-MIMO may configure the RIS to receive a control signal from the base station. In some aspects, the level of synchronization may be based on at least one of SFN level synchronization, frame level synchronization, or slot/symbol level synchronization. In the context of FIG. 8, the base station 804, at 806, may transmit a synchronization signal to the RIS 802.

At 904, the base station may transmit the control signal to the RIS. For example, 904 may be performed by control component 1142 of apparatus 1102. The control signal may comprise a RIS configuration. In some aspects, the RIS configuration may comprise a reflection configuration that may configure the RIS to reflect a signal from the base station to at least a first wireless device. In some aspects, the reflection configuration may configure the RIS to reflect a signal from at least the first wireless device to the base station. In some aspects, the reflection configuration may configure the RIS to operate as a scattering device, such that the impinging wave is scattered by the RIS. In some aspects, the RIS may be deployed in near field instances, such that the reflection configuration may alter a focal point of the RIS. In some aspects, the reflection configuration may include a time-varying reflection matrix for watermarking purposes. In some aspects, the reflection configuration may include a power-on and/or a power-off capability to configure the RIS to either power-on or to power-off. The reflection configuration may indicate timing information in which at least the first wireless device is scheduled to receive a transmission from the base station. The reflection configuration may indicate timing information in which the base station is scheduled to receive a transmission from at least the first wireless device. In some aspects, the control signal may comprise a sequence based control channel. In some aspects, the control signal may comprise a PDCCH based control channel. The control signal may include DMRS between symbols and may be modulated using QAM. In some aspects, a scrambling sequence of the PDCCH based control channel may be based on a physical cell identifier of the base station and an identifier of the RIS. In some aspects, the control signal may be transmitted in dedicated resources independent of a downlink bandwidth part for transmission to at least a first wireless device. In some aspects, the dedicated resources of the control signal may overlap the downlink bandwidth part. The downlink bandwidth part may include an indication for at least the first wireless device indicating that the dedicated resources of the control signal overlap the downlink bandwidth part transmitted to at least the first wireless device. In some aspects, the dedicated resources of the control signal do not overlap the downlink bandwidth part. In some aspects, a time-frequency tracking at the RIS may be based on the control signal transmitted to the RIS. In the context of FIG. 8, the base station 804, at 808, may transmit a control signal to the RIS 802.

Figure 10:
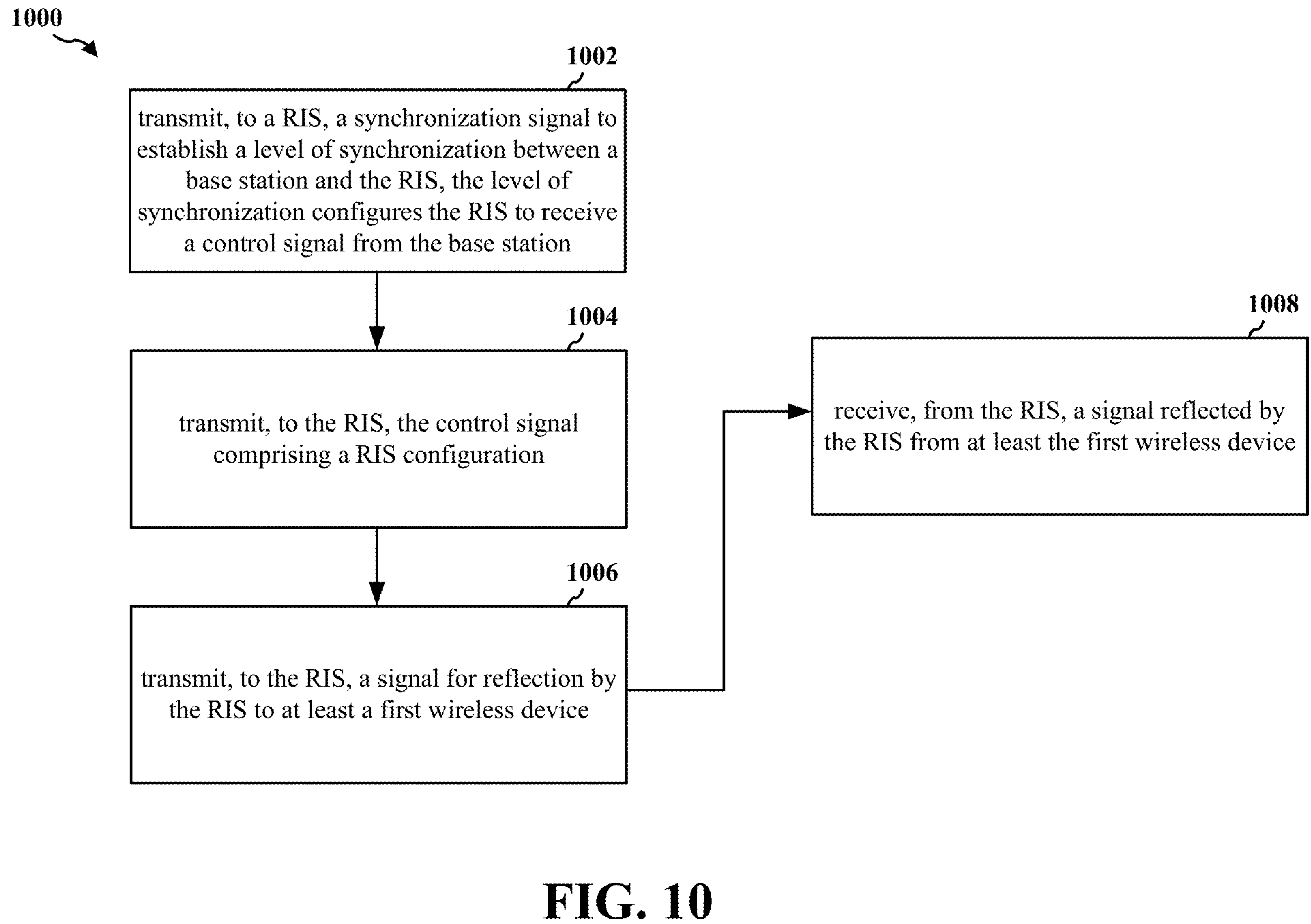
FIG. 10 is a flowchart of a method of wireless communication.

FIG. 10 is a flowchart 1000 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to provide an over the air control interface for a RIS.

At 1002, the base station may transmit a synchronization signal. For example, 1002 may be performed by synchronization component 1140 of apparatus 1102. The base station may transmit the synchronization signal to a RIS. The synchronization signal may establish a level of synchronization between the base station and the RIS. The level of synchronization between the base station and the P-MIMO may configure the RIS to receive a control signal from the base station. In some aspects, the level of synchronization may be based on at least one of SFN level synchronization, frame level synchronization, or slot/symbol level synchronization. In the context of FIG. 8, the base station 804, at 806, may transmit a synchronization signal to the RIS 802.

At 1004, the base station may transmit the control signal to the RIS. For example, 1004 may be performed by control component 1142 of apparatus 1102. The control signal may comprise a RIS configuration. In some aspects, the RIS configuration may comprise a reflection configuration that may configure the RIS to reflect a signal from the base station to at least a first wireless device. In some aspects, the reflection configuration may configure the RIS to reflect a signal from at least the first wireless device to the base station. In some aspects, the reflection configuration may configure the RIS to operate as a scattering device, such that the impinging wave is scattered by the RIS. In some aspects, the RIS may be deployed in near field instances, such that the reflection configuration may alter a focal point of the RIS. In some aspects, the reflection configuration may include a time-varying reflection matrix for watermarking purposes. In some aspects, the reflection configuration may include a power-on and/or a power-off capability to configure the RIS to either power-on or to power-off. The reflection configuration may indicate timing information in which at least the first wireless device is scheduled to receive a transmission from the base station. The reflection configuration may indicate timing information in which the base station is scheduled to receive a transmission from at least the first wireless device. In some aspects, the control signal may comprise a sequence based control channel. In some aspects, the control signal may comprise a PDCCH based control channel. The control signal may include DMRS between symbols and may be modulated using QAM. In some aspects, a scrambling sequence of the PDCCH based control channel may be based on a physical cell identifier of the base station and an identifier of the RIS. In some aspects, the control signal may be transmitted in dedicated resources independent of a downlink bandwidth part for transmission to at least a first wireless device. In some aspects, the dedicated resources of the control signal may overlap the downlink bandwidth part. The downlink bandwidth part may include an indication for at least the first wireless device indicating that the dedicated resources of the control signal overlap the downlink bandwidth part transmitted to at least the first wireless device. In some aspects, the dedicated resources of the control signal do not overlap the downlink bandwidth part. In some aspects, a time-frequency tracking at the RIS may be based on the control signal transmitted to the RIS. In the context of FIG. 8, the base station 804, at 808, may transmit a control signal to the RIS 802.

At 1006, the base station may transmit a signal for reflection. For example, 1006 may be performed by signal component 1144 of apparatus 1102. The base station may transmit, to the RIS, the signal for reflection. The base station may transmit, to the RIS, the signal for reflection by the RIS to at least a first wireless device. In the context of FIG. 8, the base station 804, at 812, may transmit a signal for reflection by the RIS 802.

At 1008, the base station may receive a reflected signal. For example, 1008 may be performed by signal component 1144 of apparatus 1102. The base station may receive the reflected signal from the RIS. The RIS may reflect the signal from at least the first wireless device to the base station. In the context of FIG. 8, the base station 804, at 818, may receive a reflected signal from the RIS 802.

Figure 11:
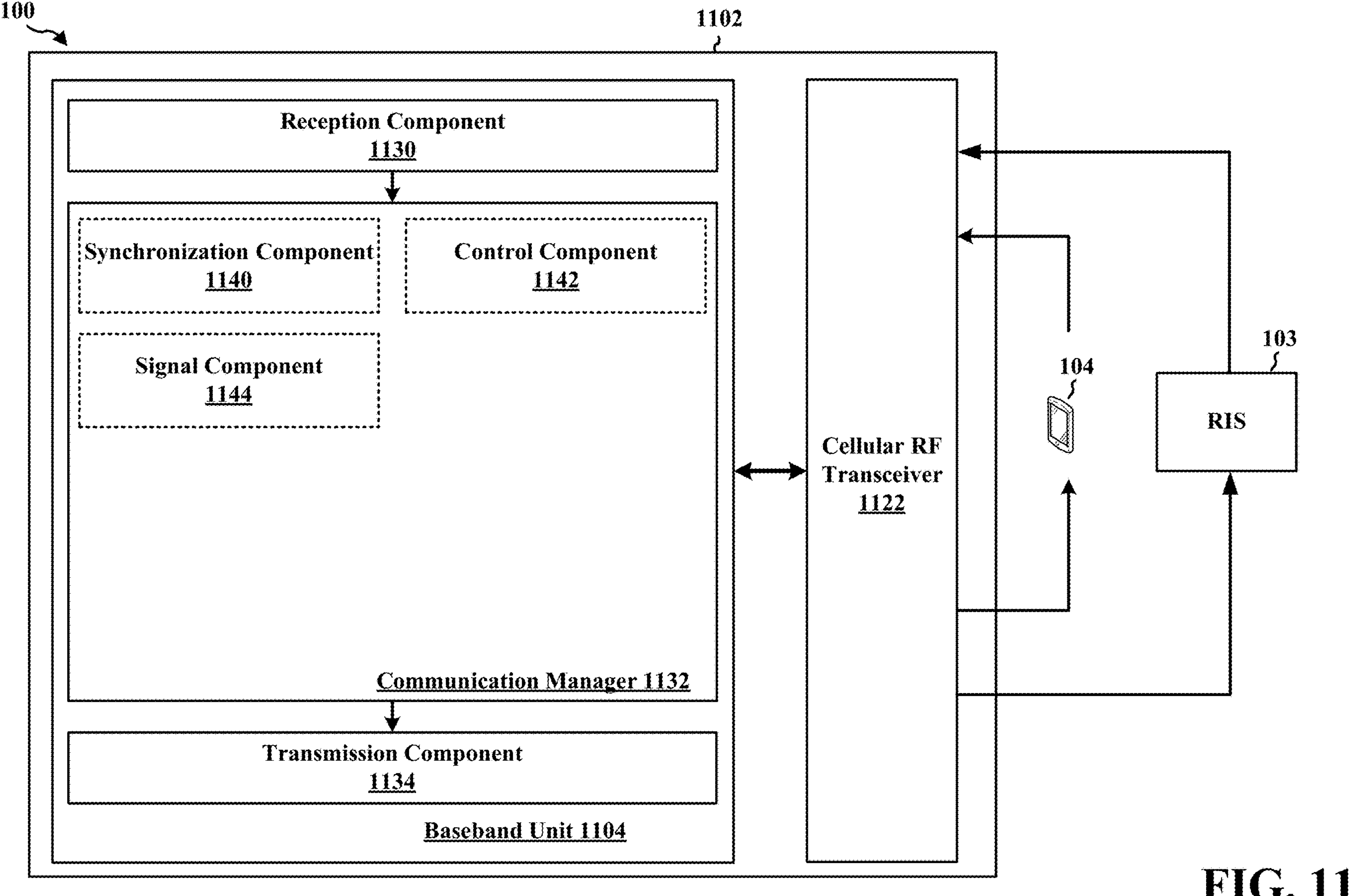
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a synchronization component 1140 that may transmit a synchronization signal, e.g., as described in connection with 902 of FIG. 9 or 1002 of FIG. 10. The communication manager 1132 further includes a control component 1142 that may transmit the control signal to the RIS, e.g., as described in connection with 904 of FIG. 9 or 1004 of FIG. 10. The communication manager 1132 further includes a signal component 1144 that may transmit a signal for reflection, e.g., as described in connection with 1006 of FIG. 10. The signal component 1144 may be further configured to receive a reflected signal, e.g., as described in connection with 1008 of FIG. 10.

The apparatus may include additional components that perform each of the blocks of the algorithm in the flowcharts of FIG. 9 or 10. As such, each block in the flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a RIS, a synchronization signal to establish a level of synchronization between the base station and the RIS. The level of synchronization between the base station and the P-MIMO configures the RIS to receive a control signal from the base station. The apparatus includes means for transmitting, to the RIS, the control signal comprising a RIS configuration. The apparatus further includes means for transmitting, to the RIS, a signal for reflection by the RIS to at least a first wireless device. The apparatus further includes means for receiving, from the RIS, a signal reflected by the RIS from at least the first wireless device. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
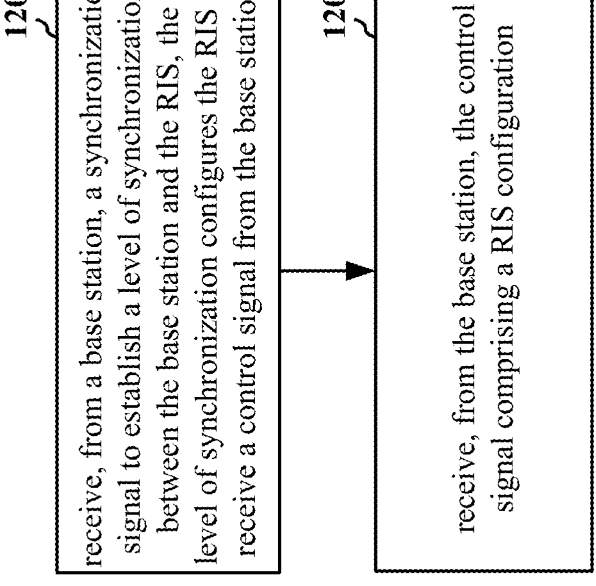
FIG. 12 is a flowchart of a method of wireless communication.

FIG. 12 is a flowchart 1200 of a method of wireless communication. The method may be performed by a RIS or a component of a RIS (e.g. the RIS 103, 406, 508, 802; the apparatus 1402; the controller processing unit 1404). One or more of the illustrated operations may be omitted, transposed, or contemporaneous. The method may allow a RIS to receive an over the air control interface from a base station.

At 1202, the RIS may receive a synchronization signal. For example, 1202 may be performed by synchronization component 1440 of apparatus 1402. The RIS may receive the synchronization signal from a base station. The synchronization signal may establish a level of synchronization between the base station and the RIS. The level of synchronization between the base station and the RIS may configure the RIS to receive a control signal from the base station. In some aspects, the level of synchronization may be based on at least one of SFN level synchronization, frame level synchronization, or slot/symbol level synchronization. In the context of FIG. 8, the RIS 802, at 806, may receive a synchronization signal from the base station 804.

At 1204, the RIS may receive the control signal from the base station. For example, 1204 may be performed by control component 1442 of apparatus 1402. The control signal may comprise a RIS configuration. In some aspects, the RIS configuration may comprise a reflection configuration that may configure the RIS to reflect a signal from the base station to at least a first wireless device. In some aspects, the reflection configuration may configure the RIS to reflect a signal from at least the first wireless device to the base station. In some aspects, the reflection configuration may configure the RIS to operate as a scattering device, such that the impinging wave is scattered by the RIS. In some aspects, the RIS may be deployed in near field instances, such that the reflection configuration may alter a focal point of the RIS. In some aspects, the reflection configuration may include a time-varying reflection matrix for watermarking purposes. In some aspects, the reflection configuration may include a power-on and/or a power-off capability to configure the RIS to either power-on or to power-off. The reflection configuration may indicate timing information in which at least the first wireless device is scheduled to receive a transmission from the base station. The reflection configuration may indicate timing information in which the base station is scheduled to receive a transmission from at least the first wireless device. In some aspects, the control signal may comprise a sequence based control channel. In some aspects, the control signal may comprise a PDCCH based control channel. The control signal may include DMRS between symbols and may be modulated using QAM. In some aspects, a scrambling sequence of the PDCCH based control channel may be based on a physical cell identifier of the base station and an identifier of the RIS. In some aspects, the control signal may be transmitted by the base station in dedicated resources independent of a downlink bandwidth part for transmission to at least a first wireless device. In some aspects, the dedicated resources of the control signal may overlap the downlink bandwidth part. The downlink bandwidth part may include an indication for at least the first wireless device indicating that the dedicated resources of the control signal overlap the downlink bandwidth part transmitted to at least the first wireless device. In some aspects, the dedicated resources of the control signal do not overlap the downlink bandwidth part. In some aspects, a time-frequency tracking at the RIS may be based on the control signal transmitted to the RIS. In the context of FIG. 8, the RIS 802, at 808, may receive a control signal from the base station 804.

Figure 13:
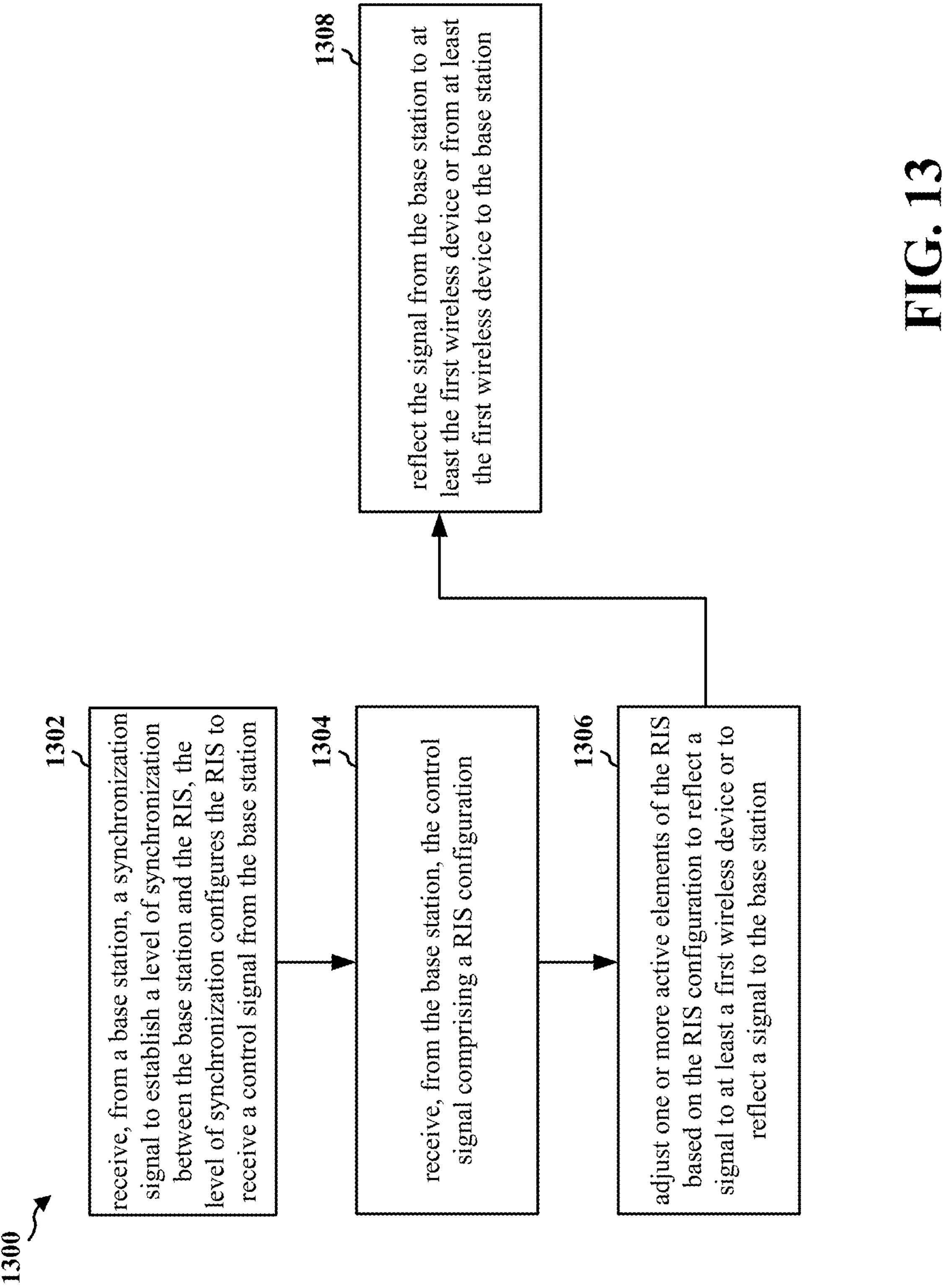
FIG. 13 is a flowchart of a method of wireless communication.

FIG. 13 is a flowchart 1300 of a method of wireless communication. The method may be performed by a RIS or a component of a RIS (e.g. the RIS 103, 406, 508, 802; the apparatus 1402; the controller processing unit 1404). One or more of the illustrated operations may be omitted, transposed, or contemporaneous. The method may allow a RIS to receive an over the air control interface from a base station.

At 1302, the RIS may receive a synchronization signal. For example, 1302 may be performed by synchronization component 1440 of apparatus 1402. The RIS may receive the synchronization signal from a base station. The synchronization signal may establish a level of synchronization between the base station and the RIS. The level of synchronization between the base station and the RIS may configure the RIS to receive a control signal from the base station. In some aspects, the level of synchronization may be based on at least one of SFN level synchronization, frame level synchronization, or slot/symbol level synchronization. In the context of FIG. 8, the RIS 802, at 806, may receive a synchronization signal from the base station 804.

At 1304, the RIS may receive the control signal from the base station. For example, 1304 may be performed by control component 1442 of apparatus 1402. The control signal may comprise a RIS configuration. In some aspects, the RIS configuration may comprise a reflection configuration that may configure the RIS to reflect a signal from the base station to at least a first wireless device. In some aspects, the reflection configuration may configure the RIS to reflect a signal from at least the first wireless device to the base station. In some aspects, the reflection configuration may configure the RIS to operate as a scattering device, such that the impinging wave is scattered by the RIS. In some aspects, the RIS may be deployed in near field instances, such that the reflection configuration may alter a focal point of the RIS. In some aspects, the reflection configuration may include a time-varying reflection matrix for watermarking purposes. In some aspects, the reflection configuration may include a power-on and/or a power-off capability to configure the RIS to either power-on or to power-off. The reflection configuration may indicate timing information in which at least the first wireless device is scheduled to receive a transmission from the base station. The reflection configuration may indicate timing information in which the base station is scheduled to receive a transmission from at least the first wireless device. In some aspects, the control signal may comprise a sequence based control channel. In some aspects, the control signal may comprise a PDCCH based control channel. The control signal may include DMRS between symbols and may be modulated using QAM. In some aspects, a scrambling sequence of the PDCCH based control channel may be based on a physical cell identifier of the base station and an identifier of the RIS. In some aspects, the control signal may be transmitted by the base station in dedicated resources independent of a downlink bandwidth part for transmission to at least a first wireless device. In some aspects, the dedicated resources of the control signal may overlap the downlink bandwidth part. The downlink bandwidth part may include an indication for at least the first wireless device indicating that the dedicated resources of the control signal overlap the downlink bandwidth part transmitted to at least the first wireless device. In some aspects, the dedicated resources of the control signal do not overlap the downlink bandwidth part. In some aspects, a time-frequency tracking at the RIS may be based on the control signal transmitted to the RIS. In the context of FIG. 8, the RIS 802, at 808, may receive a control signal from the base station 804.

At 1306, the RIS may adjust one or more active elements of the RIS. For example, 1306 may be performed by adjust component 1444 of apparatus 1402. The RIS may adjust the one or more active elements of the RIS based on the RIS configuration. The RIS may adjust the one or more active elements of the RIS based on the RIS configuration to reflect a signal, from the base station, to at least a first wireless device. The RIS may adjust the one or more active elements of the RIS based on the RIS configuration to reflect a signal, from at least the first wireless device, to the base station. In the context of FIG. 8, the RIS 802, at 810, may adjust one or more active elements of the RIS based on the RIS configuration.

At 1308, the RIS may reflect the signal from the base station or at least the first wireless device. For example, 1308 may be performed by reflection component 1446 of apparatus 1402. The RIS may reflect the signal from the base station to the at least the first wireless device. The RIS may reflect the signal from at least the first wireless device to the base station. In the context of FIG. 8, the RIS 802, at 814, may reflect the signal from the base station to at least a first wireless device (not shown). In the context of FIG. 8, the RIS 802, at 818, may reflect the signal from at least the first wireless device (not shown) to the base station 804.

Figure 14:
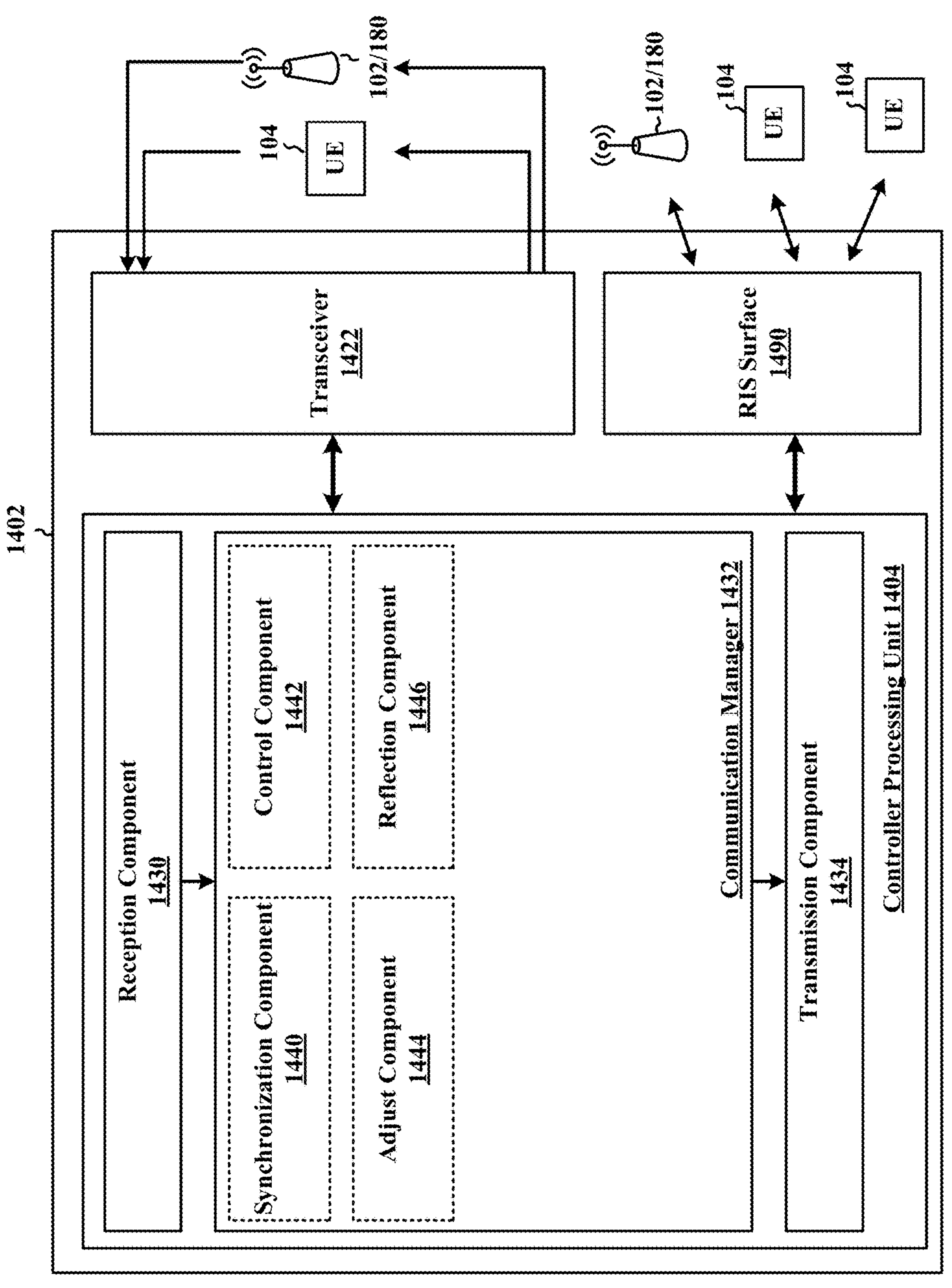
FIG. 14 is a diagram illustrating an example of a hardware implementation for an example apparatus.

FIG. 14 is a diagram 1400 illustrating an example of a hardware implementation for an apparatus 1402. The apparatus 1402 may be a RIS and may include a controller processing unit 1404, e.g., as a part of a controller processor unit. The controller processing unit 1404 may communicate through a cellular RF transceiver 1422 via sidelink with the UE 104 and/or base station 102/180. The apparatus 1402 may further include a P-MIMO surface 1490. The controller processing unit 1404 may include a computer-readable medium/memory. The controller processing unit 1404 is responsible for general processing, including the execution of software stored on the computer-readable medium/memory. The software, when executed by the controller processing unit 1404, causes the controller processing unit 1404 to perform the various functions described supra. The computer-readable medium/memory may also be used for storing data that is manipulated by the controller processing unit 1404 when executing software. The controller processing unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the controller processing unit 1404. The controller processing unit 1404 may be a component of the RIS 103 and may include the memory 376 and/or at least one of the TX processor 316, the RX processor 370, and the controller/processor 375, such as described in connection with the device 310.

The communication manager 1432 includes a synchronization component 1440 that may receive a synchronization signal, e.g., as described in connection with 1202 of FIG. 12 or 1302 of FIG. 13. The communication manager 1432 further includes a control component 1442 that may receive the control signal from the base station, e.g., as described in connection with 1204 of FIG. 12 or 1304 of FIG. 13. The communication manager 1432 further includes an adjust component 1444 that may adjust one or more active elements of the RIS, e.g., as described in connection with 1306 of FIG. 13. The communication manager 1432 further includes a reflection component 1446 that may reflect the signal from the base station or at least the first wireless device, e.g., as described in connection with 1308 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the controller processing unit 1404, includes means for receiving, from a base station, a synchronization signal to establish a level of synchronization between the base station and the RIS. The level of synchronization between the base station and the RIS configures the RIS to receive a control signal from the base station. The apparatus includes means for receiving, from the base station, the control signal comprising a RIS configuration. The apparatus further includes means for adjusting one or more active elements of the RIS based on the RIS configuration to reflect a signal to at least a first wireless device or to reflect a signal to the base station. The apparatus further includes means for reflecting the signal from the base station to at least the first wireless device or from at least the first wireless device to the base station. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” Terms such as “if,” “when,” and “while” should be interpreted to mean “under the condition that” rather than imply an immediate temporal relationship or reaction. That is, these phrases, e.g., “when,” do not imply an immediate action in response to or during the occurrence of an action, but simply imply that if a condition is met then an action will occur, but without requiring a specific or immediate time constraint for the action to occur. The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to transmit, to a RIS, a synchronization signal to establish a level of synchronization between the base station and the RIS, wherein the level of synchronization between the base station and the RIS configures the RIS to receive a control signal from the base station; and transmit, to the RIS, the control signal comprising a RIS configuration.

Aspect 2 is the apparatus of aspect 1, further includes a transceiver coupled to the at least one processor.

Aspect 3 is the apparatus of any of aspects 1 and 2, further includes that the level of synchronization is based on at least one of SFN level synchronization, frame level synchronization, or slot/symbol level synchronization.

Aspect 4 is the apparatus of any of aspects 1-3, further includes that the RIS configuration comprises a reflection configuration for the RIS to reflect a signal from the base station to at least a first wireless device or to reflect a signal from at least the first wireless device to the base station.

Aspect 5 is the apparatus of any of aspects 1-4, further includes that the reflection configuration indicates timing information in which at least the first wireless device is scheduled to receive a transmission from the base station, wherein the reflection configuration indicates timing information in which the base station is scheduled to receive a transmission from at least the first wireless device.

Aspect 6 is the apparatus of any of aspects 1-5, further includes that the at least one processor is further configured to transmit, to the RIS, a signal for reflection by the RIS to at least a first wireless device; or receive, from the RIS, a signal reflected by the RIS from at least the first wireless device.

Aspect 7 is the apparatus of any of aspects 1-6, further includes that the control signal comprises a sequence based control channel.

Aspect 8 is the apparatus of any of aspects 1-7, further includes that the control signal comprises a PDCCH based control channel, wherein the control signal includes a DMRS between symbols and is modulated using QAM.

Aspect 9 is the apparatus of any of aspects 1-8, further includes that a scrambling sequence of the PDCCH based control channel is based on a physical cell identifier of the base station and an identifier of the RIS.

Aspect 10 is the apparatus of any of aspects 1-9, further includes that the control signal is transmitted in dedicated resources independent of a downlink bandwidth part for transmission to at least a first wireless device.

Aspect 11 is the apparatus of any of aspects 1-10, further includes that the dedicated resources of the control signal overlap the downlink bandwidth part, wherein the downlink bandwidth part includes an indication for at least the first wireless device indicating that the dedicated resources of the control signal overlap the downlink bandwidth part transmitted to at least the first wireless device.

Aspect 12 is the apparatus of any of aspects 1-11, further includes that the dedicated resources of the control signal do not overlap the downlink bandwidth part.

Aspect 13 is the apparatus of any of aspects 1-12, further includes that a time-frequency tracking at the RIS is based on the control signal transmitted to the RIS.

Aspect 14 is a method of wireless communication for implementing any of aspects 1-13.

Aspect 15 is an apparatus for wireless communication including means for implementing any of aspects 1-13.

Aspect 16 is a computer-readable medium storing computer executable code, where the code when executed by a processor causes the processor to implement any of aspects 1-13.

Aspect 17 is an apparatus for wireless communication at a RIS including at least one processor coupled to a memory and configured to receive, from a base station, a synchronization signal to establish a level of synchronization between the base station and the RIS, wherein the level of synchronization between the base station and the RIS configures the RIS to receive a control signal from the base station; and receive, from the base station, the control signal comprising a RIS configuration.

Aspect 18 is the apparatus of aspect 17, further includes a transceiver coupled to the at least one processor.

Aspect 19 is the apparatus of any of aspects 17 and 18, further includes that the level of synchronization is based on at least one of SFN level synchronization, frame level synchronization, or slot/symbol level synchronization.

Aspect 20 is the apparatus of any of aspects 17-19, further includes that the RIS configuration comprises a reflection configuration for the RIS to reflect a signal from the base station to at least a first wireless device or to reflect a signal from at least the first wireless device to the base station.

Aspect 21 is the apparatus of any of aspects 17-20, further includes that the reflection configuration indicates timing information in which at least the first wireless device is scheduled to receive a transmission from the base station, wherein the reflection configuration indicates timing information in which the base station is scheduled to receive a transmission from at least the first wireless device.

Aspect 22 is the apparatus of any of aspects 17-21, further includes that the at least one processor is further configured to adjust one or more active elements of the RIS based on the RIS configuration to reflect a signal to at least a first wireless device or to reflect a signal to the base station; and reflect the signal from the base station to at least the first wireless device or from at least the first wireless device to the base station.

Aspect 23 is the apparatus of any of aspects 17-22, further includes that the control signal comprises a sequence based control channel.

Aspect 24 is the apparatus of any of aspects 17-23, further includes that the control signal comprises a PDCCH based control channel, wherein the control signal includes a DMRS between symbols and is modulated using QAM.

Aspect 25 is the apparatus of any of aspects 17-24, further includes that a scrambling sequence of the PDCCH based control channel is based on a physical cell identifier of the base station and an identifier of the RIS.

Aspect 26 is the apparatus of any of aspects 17-25, further includes that the control signal is transmitted by the base station in dedicated resources independent of a downlink bandwidth part for transmission to at least a first wireless device.

Aspect 27 is the apparatus of any of aspects 17-26, further includes that the dedicated resources of the control signal overlap the downlink bandwidth part, wherein the downlink bandwidth part includes an indication for at least the first wireless device indicating that the dedicated resources of the control signal overlap the downlink bandwidth part transmitted to at least the first wireless device.

Aspect 28 is the apparatus of any of aspects 17-27, further includes that the dedicated resources of the control signal do not overlap the downlink bandwidth part.

Aspect 29 is the apparatus of any of aspects 17-28, further includes that a time-frequency tracking at the RIS is based on the control signal transmitted to the RIS.

Aspect 30 is a method of wireless communication for implementing any of aspects 17-29.

Aspect 31 is an apparatus for wireless communication including means for implementing any of aspects 17-29.

Aspect 32 is a computer-readable medium storing computer executable code, where the code when executed by a processor causes the processor to implement any of aspects 17-29.

What is claimed is:

1. An apparatus for wireless communication at a base station, comprising:

a memory; and at least one processor coupled to the memory and configured to:

transmit, to a reflective intelligent surface (RIS), a synchronization signal to establish a level of synchronization between the base station and the RIS, wherein the level of synchronization between the base station and the RIS configures the RIS to receive a control signal from the base station; and transmit, to the RIS, the control signal comprising a RIS configuration.

2. The apparatus of claim 1, further comprising a transceiver coupled to the at least one processor.

3. The apparatus of claim 1, wherein the level of synchronization is based on at least one of system frame number (SFN) level synchronization, frame level synchronization, or slot/symbol level synchronization.

4. The apparatus of claim 1, wherein the RIS configuration comprises a reflection configuration for the RIS to reflect a signal from the base station to at least a first wireless device or to reflect a signal from at least the first wireless device to the base station.

5. The apparatus of claim 4, wherein the reflection configuration indicates timing information in which at least the first wireless device is scheduled to receive a transmission from the base station, wherein the reflection configuration indicates timing information in which the base station is scheduled to receive a transmission from at least the first wireless device.

6. The apparatus of claim 1, wherein the at least one processor is further configured to:

transmit, to the RIS, a signal for reflection by the MS to at least a first wireless device; or receive, from the RIS, a signal reflected by the MS from at least the first wireless device.

7. The apparatus of claim 1, wherein the control signal comprises a sequence based control channel.

8. The apparatus of claim 1, wherein the control signal comprises a physical downlink control channel (PDCCH) based control channel, wherein the control signal includes a demodulation reference signal (DMRS) between symbols and is modulated using quadrature amplitude modulation (QAM).

9. The apparatus of claim 8, wherein a scrambling sequence of the PDCCH based control channel is based on a physical cell identifier of the base station and an identifier of the RIS.

10. The apparatus of claim 1, wherein the control signal is transmitted in dedicated resources independent of a downlink bandwidth part for transmission to at least a first wireless device.

11. The apparatus of claim 10, wherein the dedicated resources of the control signal overlap the downlink bandwidth part, wherein the downlink bandwidth part includes an indication for at least the first wireless device indicating that the dedicated resources of the control signal overlap the downlink bandwidth part transmitted to at least the first wireless device.

12. The apparatus of claim 10, wherein the dedicated resources of the control signal do not overlap the downlink bandwidth part.

13. The apparatus of claim 1, wherein a time-frequency tracking at the RIS is based on the control signal transmitted to the RIS.

14. A method of wireless communication at a base station, comprising:

transmitting, to a reflective intelligent surface (RIS), a synchronization signal to establish a level of synchronization between the base station and the RIS, wherein the level of synchronization between the base station and the RIS configures the RIS to receive a control signal from the base station; and transmitting, to the RIS, the control signal comprising a MS configuration.

15. The method of claim 14, further comprising:

transmitting, to the RIS, a signal for reflection by the MS to at least a first wireless device.

16. An apparatus for wireless communication at a reflective intelligent surface (MS), comprising:

a memory; and at least one processor coupled to the memory and configured to:

receive, from a base station, a synchronization signal to establish a level of synchronization between the base station and the MS, wherein the level of synchronization between the base station and the MS configures the MS to receive a control signal from the base station; and receive, from the base station, the control signal comprising a MS configuration.

17. The apparatus of claim 16, further comprising a transceiver coupled to the at least one processor.

18. The apparatus of claim 16, wherein the level of synchronization is based on at least one of system frame number (SFN) level synchronization, frame level synchronization, or slot/symbol level synchronization.

19. The apparatus of claim 16, wherein the MS configuration comprises a reflection configuration for the MS to reflect a signal from the base station to at least a first wireless device or to reflect a signal from at least the first wireless device to the base station.

20. The apparatus of claim 19, wherein the reflection configuration indicates timing information in which at least the first wireless device is scheduled to receive a transmission from the base station, wherein the reflection configuration indicates timing information in which the base station is scheduled to receive a transmission from at least the first wireless device.

21. The apparatus of claim 16, wherein the at least one processor is further configured to:

adjust one or more active elements of the RIS based on the RIS configuration to reflect a signal to at least a first wireless device or to reflect a signal to the base station; and reflect the signal from the base station to at least the first wireless device or from at least the first wireless device to the base station.

22. The apparatus of claim 16, wherein the control signal comprises a sequence based control channel.

23. The apparatus of claim 16, wherein the control signal comprises a physical downlink control channel (PDCCH) based control channel, wherein the control signal includes a demodulation reference signal (DMRS) between symbols and is modulated using quadrature amplitude modulation (QAM).

24. The apparatus of claim 23, wherein a scrambling sequence of the PDCCH based control channel is based on a physical cell identifier of the base station and an identifier of the RIS.

25. The apparatus of claim 16, wherein the control signal is transmitted by the base station in dedicated resources independent of a downlink bandwidth part for transmission to at least a first wireless device.

26. The apparatus of claim 25, wherein the dedicated resources of the control signal overlap the downlink bandwidth part, wherein the downlink bandwidth part includes an indication for at least the first wireless device indicating that the dedicated resources of the control signal overlap the downlink bandwidth part transmitted to at least the first wireless device.

27. The apparatus of claim 25, wherein the dedicated resources of the control signal do not overlap the downlink bandwidth part.

28. The apparatus of claim 16, wherein a time-frequency tracking at the RIS is based on the control signal transmitted to the RIS.

29. A method of wireless communication at a reflective intelligent surface (RIS), comprising:

receiving, from a base station, a synchronization signal to establish a level of synchronization between the base station and the RIS, wherein the level of synchronization between the base station and the RIS configures the RIS to receive a control signal from the base station; and receiving, from the base station, the control signal comprising a RIS configuration.

30. The method of claim 29, further comprising:

adjusting one or more active elements of the RIS based on the RIS configuration to reflect a signal to at least a first wireless device; and reflecting the signal from the base station to at least the first wireless device.

* * * * *